(12) United States Patent
Peacock et al.

(10) Patent No.: US 11,553,689 B2
(45) Date of Patent: Jan. 17, 2023

(54) FEEDING BOWL ASSEMBLY

(71) Applicant: Peak Pet Products Ltd, Ongar (GB)

(72) Inventors: Robert Philip Peacock, Coventry (GB); Ivor Ponting, Essex (GB)

(73) Assignee: Peak Pet Products Ltd

( * ) Notice: Subject to any disclaimer, the term of this patent is extended or adjusted under 35 U.S.C. 154(b) by 476 days.

(21) Appl. No.: 16/614,702

(22) PCT Filed: May 19, 2017

(86) PCT No.: PCT/GB2017/051409
§ 371 (c)(1),
(2) Date: Nov. 18, 2019

(87) PCT Pub. No.: WO2017/199047
PCT Pub. Date: Nov. 23, 2017

(65) Prior Publication Data
US 2020/0178499 A1    Jun. 11, 2020

(30) Foreign Application Priority Data

May 20, 2016 (GB) .................................. 1608938

(51) Int. Cl.
*A01K 5/01* (2006.01)

(52) U.S. Cl.
CPC .................. *A01K 5/0135* (2013.01)

(58) Field of Classification Search
CPC ...... A01K 5/01; A01K 5/0114; A01K 5/0135; B65D 21/0212; B65D 21/0028; A47G 19/2261; A47G 19/2294
USPC ......................................................... 220/603
See application file for complete search history.

(56) References Cited

U.S. PATENT DOCUMENTS

| 3,498,268 A | * | 3/1970 | Langevin | A01K 5/0135 |
| | | | | 119/61.54 |
| 3,653,362 A | | 4/1972 | Davis | |
| 4,691,664 A | * | 9/1987 | Crowell | A01K 7/00 |
| | | | | 119/61.52 |
| 5,709,168 A | * | 1/1998 | Walker | A01K 5/01 |
| | | | | 119/61.5 |
| 5,787,839 A | | 8/1998 | Magnant | |
| 6,112,698 A | * | 9/2000 | Zelinger | A01K 5/0135 |
| | | | | 119/61.54 |

(Continued)

OTHER PUBLICATIONS

International Search Report from European Patent Office in PCT/GB2017/051409 dated Sep. 22, 2017.

(Continued)

*Primary Examiner* — Brady W Frazier
*Assistant Examiner* — Zoe Tam Tran
(74) *Attorney, Agent, or Firm* — Keusey & Associates, P.C.

(57) ABSTRACT

A feeding bowl assembly (1) for feeding small animals. The feeding bowl assembly (1) comprises a feeding bowl (2) and a base (3). The feeding bowl (2) is releasably mounted to the base (3) in a locked orientation and an unlocked orientation. The feeding bowl (2) comprises one or more connectors (6) and the base (3) comprises one or more complimentary connectors (12). The locked and unlocked orientations are formed by engagement of the one or more connectors (6) with the one or more complimentary connectors (12).

20 Claims, 6 Drawing Sheets

(56) References Cited

U.S. PATENT DOCUMENTS

| | | | |
|---|---|---|---|
| 6,786,177 B1* | 9/2004 | Lemkin | A01K 5/0114 |
| | | | 119/51.01 |
| 7,913,648 B2* | 3/2011 | Maeda | A01K 7/027 |
| | | | 119/61.52 |
| 2008/0216754 A1* | 9/2008 | Lorenzana | A01K 5/0114 |
| | | | 119/61.55 |
| 2009/0241844 A1* | 10/2009 | Becattini, Jr. | A01K 7/005 |
| | | | 119/51.5 |
| 2013/0019808 A1 | 1/2013 | Lathim | |

OTHER PUBLICATIONS

Pet Supplies / Pet Weighter Bowl—Large & Heavy Dog Food Bowl—Elevated Dog & Cat Water Bowl—Non-Slip & Splash Free Bowl for Large Pets by PetWeighter / Amazon.com.

* cited by examiner

FEEDING BOWL ASSEMBLY

TECHNICAL FIELD OF THE INVENTION

The present invention relates to a feeding bowl assembly for feeding small domestic animals, in particular to a feeding bowl assembly comprising a feeding bowl and a base.

BACKGROUND TO THE INVENTION

Animals feeding bowls are often placed on flat, smooth floors. When an animal eats or drinks from the feeding bowl, the feeding bowl may be pushed around the floor by the animal, either intentionally or unintentionally. This movement can result in spillage of the food or water contained within the feeding bowl.

To address this problem, a known feeding bowl assembly comprises a feeding bowl releasably mountable to a weighted base. The feeding bowl can be unlocked from the base to be filled with food or water and then locked to the base to prevent it being moved around on the floor by an animal.

However, such a feeding bowl assembly has limited functionality and it may be difficult for elderly animal owners to unlock and lock the feeding bowl to the base. This can be particularly frustrating for the owner if the feeding bowl does not need to be locked to the base because their animal is inactive and/or weak and thus is unlikely knock the mounted feeding bowl off of the base.

Embodiments of the present invention seek to address the above problem and provide an improved feeding bowl assembly for use by both active and inactive animals.

SUMMARY OF THE INVENTION

According to a first aspect of the present invention, there is provided an animal feeding bowl assembly comprising:
  a feeding bowl comprising one or more connectors; and
  a base comprising one or more complementary connectors,
  wherein the feeding bowl is releasably mountable to the base in a locked orientation and an unlocked orientation relative to the base, and the one or more connectors and one or more complementary connectors are arranged such that in the locked orientation the feeding bowl is retained on the base by at least one of the one or more connectors engaging with at least one of the one or more complementary connectors.

In this way, the present invention provides an improved feeding bowl assembly in which the feeding bowl can be releasably mounted to the base to prevent the feeding bowl being moved around by the animal, in either an unlocked orientation or in a locked orientation. In the unlocked orientation, the feeding bowl is mounted to the base but not connected so it can be quickly and easily released therefrom. In the locked orientation, the one or more connectors on the feeding bowl automatically engage with the one or more complementary connectors on the base to securely lock the feeding bowl to the base. The provision of two different mounting orientations gives a user the choice of either locking or not locking the feeding bowl to the base. The locked orientation may be used, for example, to prevent boisterous and active animals from knocking the feeding bowl over, whereas the unlocked orientation may be used, for example, to prevent slow, lethargic or inactive animals from knocking the feeding bowl over, or by an elderly or weak user that cannot operate the connector mechanism.

Thus, the feeding bowl assembly of the present invention provides improved functionality and practicality over known feeding bowl assemblies, such as the assembly described above, since it lets different users use the same feeding bowl assembly for different animals, whilst still retaining the relative advantages of each of the locked orientation and the unlocked orientation.

The feeding bowl assembly may be suitable for feeding small domestic animals such as cats and dogs.

The feeding bowl may comprise a body. The body may be substantially cuboidal. The body may thus have a substantially square cross section and may comprise four walls. The body may have rounded edges and/or corners between its walls. A cavity may be formed within the body for containing a portion of animal feed or water. The cavity may be cylindrical. The cavity may be formed concentrically with a longitudinal axis of the feeding bowl. The cavity may be formed in a top of the feeding bowl. The feeding bowl may be formed from a resilient material such as acrylonitrile butadiene styrene.

The feeding bowl may comprise any number of connectors. The feeding bowl may comprise an even number of connectors. For example, the feeding bowl may comprise two or four or six connectors. Each connector may comprise an engagement portion for engaging with a complementary connector on the base. The engagement portion may be planar. The engagement formation may project or protrude towards the centre of the cavity. The engagement formation may thus project or protrude towards the base when the feeding bowl is adjacent the base. Each connector may comprise a clip. Each connector may comprise one or more magnets. Each connector may be flexible.

The base may comprise a cavity. The base may comprise an opening for allowing the cavity to be filled with a substance. Thus, the base may act as a reservoir. The opening may be in the centre of a top part of the base. The opening may be circular. The substance may be a weight or ballast such as sand or water, or a mixture of sand and water. In this way, the reservoir can be filled with a substance to weigh it down and thus weigh down a mounted feeding bowl to prevent it being moved around by a feeding animal.

The base may comprise an outer rim formed around its circumference. The outer rim may provide a step formation. The base may be formed from high density poly ethylene.

The base may comprise any number of complementary connectors. The base may comprise an even number of complementary connectors. For example, the base may comprise two or four or six complementary connectors. Each complementary connector may comprise a notch or indent in a wall of the base that projects or protrudes towards the centre of the base. Each complementary connector may comprise an engagement portion for engaging with the engagement portion on a connector on the feeding bowl. The engagement formation may be a lip. The engagement portion may be planar. Each complementary connector may comprise one or more magnets.

The base may comprise one or more abutment portions. The base may comprise any number of abutment portions. The base may comprise an even number of abutment portions. For example, the base may comprise two or four or six abutment portions. Each abutment portion may be an indent in the outside wall of the base. Each abutment portion may have varying depth over its surface area. The varying depth may be greater at a bottom of the abutment portion than at a top of the abutment portion. Each abutment portion may be provided on a wall of the base that does not contain a complementary connector. Each abutment portion may comprise a planar surface contacting with a connector and allowing a connector to slide thereon. Each abutment portion may be arranged to contact with a connector when the feeding bowl is mounted in its unlocked orientation on the base.

The base may further comprise opening portions for contacting a connector before the connector engages with its complementary connectors. The base may comprise one or more opening portions. The base may comprise any number of opening portions. The base may comprise an even number of opening portions. Each opening portion may comprise an indent in the outside surface of a wall of the base. Each opening portion may be formed on a wall of the base on which a complementary connectors is formed. Each opening portion may comprise a vertical face. Each opening portion may comprise a ramp portion. The ramp portion may be inclined at 45° with respect to the vertical face. In this way, opening portions are provided to initially contact the connectors and make it easier for the user to lock the feeding bowl to the base.

One or more feet may be formed on a bottom of the base for reducing the surface area of the base in contact with a floor to assist in preventing the base from being moved on the floor. The base may preferably comprise four feet. Each of the feet may comprise a rubber portion for contacting the floor.

The feeding bowl assembly may further comprise a closure for sealing or closing the reservoir. The closure may comprise a screw thread engageable with a cooperating screw thread on a flange provided adjacent or on the opening. The closure may be formed from polypropylene.

The feeding bowl assembly and/or feeding bowl may comprise connectors of different sizes and/or shapes to one another. The feeding bowl assembly and/or base may comprise complementary connectors of different sizes and/or shapes to one another, which may correspond to sizes/shapes of the connectors. Thus, the feeding bowl assembly may comprise more than one engaging set of connectors and complementary connectors and each engaging set may be of a different size and/or shape. Thus, the differently sized/shaped sets of engaging connectors and complementary connectors may be arranged to engage with each other with different locking strengths. Accordingly, the one or more connectors and/or the one or more complementary connectors may be arranged such that the feeding bowl is releasably mountable to the base in additional orientations that provide additional locking strengths between the locking strengths of the locked orientation and the unlocked orientation. The one or more connectors and/or the one or more complementary connectors may be arranged such that the feeding bowl is releasably mountable to the base in the unlocked orientation and a plurality of locked orientations. The one or more connectors and/or the one or more complementary connectors may be arranged to lock the feeding bowl to the base with different locking strength in each of the plurality of locking orientations. For example, the one or more connectors engaging with the one or more complementary connectors to provide a first locked orientation may require a high strength to disengage and thus release the feeding bowl from the base, the one or more connectors engaging with the one or more complementary connectors to provide a second locked orientation may require a medium strength to disengage and thus release the feeding bowl from the base, and the one or more connectors engaging with the one or more complementary connectors to provide a third locked orientation may require a low strength to disengage and thus release the feeding bowl from the base. In this way, additional functionality is provided to allow a user to mount the feeding bowl to the base in different ways. For example, if the feeding bowl assembly has four sides then four different orientations can be provided (three locked orientations and an unlocked orientation). If the feeding bowl assembly is substantially cylindrical then more than four different orientations can be provided (more than three locked orientations and an unlocked orientation).

DETAILED DESCRIPTION OF THE INVENTION

In order that the invention may be more clearly understood an embodiment thereof will now be described, by way of example only, with reference to the accompanying drawings, of which.

Referring to FIGS. 1 to 4, a feeding bowl assembly 1 comprises a feeding bowl 2 that is releasably mountable on a base 3. The feeding bowl 2 and base 3 both have substantially the same length and width.

The feeding bowl 2 comprises a substantially cuboidal body 4 having a substantially square cross section. The body 4 has rounded edges and comprises a cylindrical cavity 5 formed concentrically within the body 4. The body 4 comprises a lower edge 20 at the base of its walls.

The feeding bowl 2 comprises a pair of connectors 6 formed on opposing inside surfaces of the walls of the body 4. Each connector 6 is a formation having a planar engagement portion 7 that projects inwardly towards the centre of the cavity 5.

The feeding bowl 2 is formed from a resilient material such as acrylonitrile butadiene styrene such that the connectors 6 may flex.

The base 3 comprises a substantially cuboidal body 8. The base 3 is hollow, thus defining a cavity, and the cavity of the base 3 acts as reservoir 9 for storing ballast. The base 3 further comprises an opening 10 in the centre of a top surface. Four integrally formed upstands 21 are provided. The upstands 21 are cylindrical formations that protrude upwardly from the top surface of the base 3 and are arranged around the opening 10.

A closure 11 is provided and comprises a screw thread for engaging with a corresponding screw thread provided on a flange formed on the opening 10 in order to seal the reservoir 9 to contain the ballast in the base 3.

The base 3 further comprises two complementary connectors 12 and two abutment portions 15. The complementary connectors 12 are formed on opposing outside surfaces of the walls of the base 3. The abutment portions 15 are also formed on opposing outside surfaces of the walls of the base 3, on the walls of the base 3 that are perpendicular to the walls on which the complementary connectors 12 are formed (i.e. the walls of the base 3 on which the abutment portions 15 are formed are not the same walls of the base 3 on which the complementary connectors 12 are formed).

Each complementary connector 12 comprises a trapezoid shaped notch 22 that projects inwardly towards the centre of the reservoir 9, and a planar engagement portion 13 in the form of a lip at its top for engaging with the planar engagement formation 7 on a connector 6. The shape of each notch 22 allows for a user to engage their fingers with a locked connector 6 to release it from the base 3.

Each abutment portion 15 comprises a vertical indent that extends to the top of the base 3 and comprises a planar surface 16 for contacting with the planar engagement formation 7 on the connector 6. The depth of the indent in the wall of the base 3 decreases towards the top of the base 3 since the indent is vertical and the walls of the base 3 are slanted.

The base 3 further comprises a pair of opening portions 14. The opening portions 14 are indents in the outside surface of the wall of the base 3 on which the complementary connectors 12 are formed. Each opening portion 14 comprises a vertical face and a ramp portion inclined at 45° with respect to the vertical face. The opening portions 14 are positioned above the complementary connectors 12 so as to contact the engagement portions 7 of the connectors 6 before the engagement formations 7 engage with engagement portions 13 of the complementary connectors 12.

The base 3 further comprises a protruding rim 19 formed around the circumference of the base 3. The rim 19 has an upper portion and a lower portion, with the upper portion having a smaller diameter than the lower portion so as to form a step.

The base 3 further comprises a pair of handles 17 formed on the bottom of the outside surface of the same walls of the base 3 that the abutment portions 15 are formed. Each handle 17 is a is a trapezoid shaped notch that projects inwardly towards the centre of the reservoir 9 and is shaped so that it may be gripped by a user to allow the base 3 and/or feeding bowl assembly 1 to be moved.

Four feet 18 are formed on the bottom of the base 3, which reduces the surface area of the base 3 in contact with a floor to assist in preventing the base 3 from being pushed around. Each of the four feet 18 comprises a rubber portion for contacting the floor.

The base 3 is formed from high-density poly ethylene and the closure 11 is formed from polypropylene.

Figure 1:
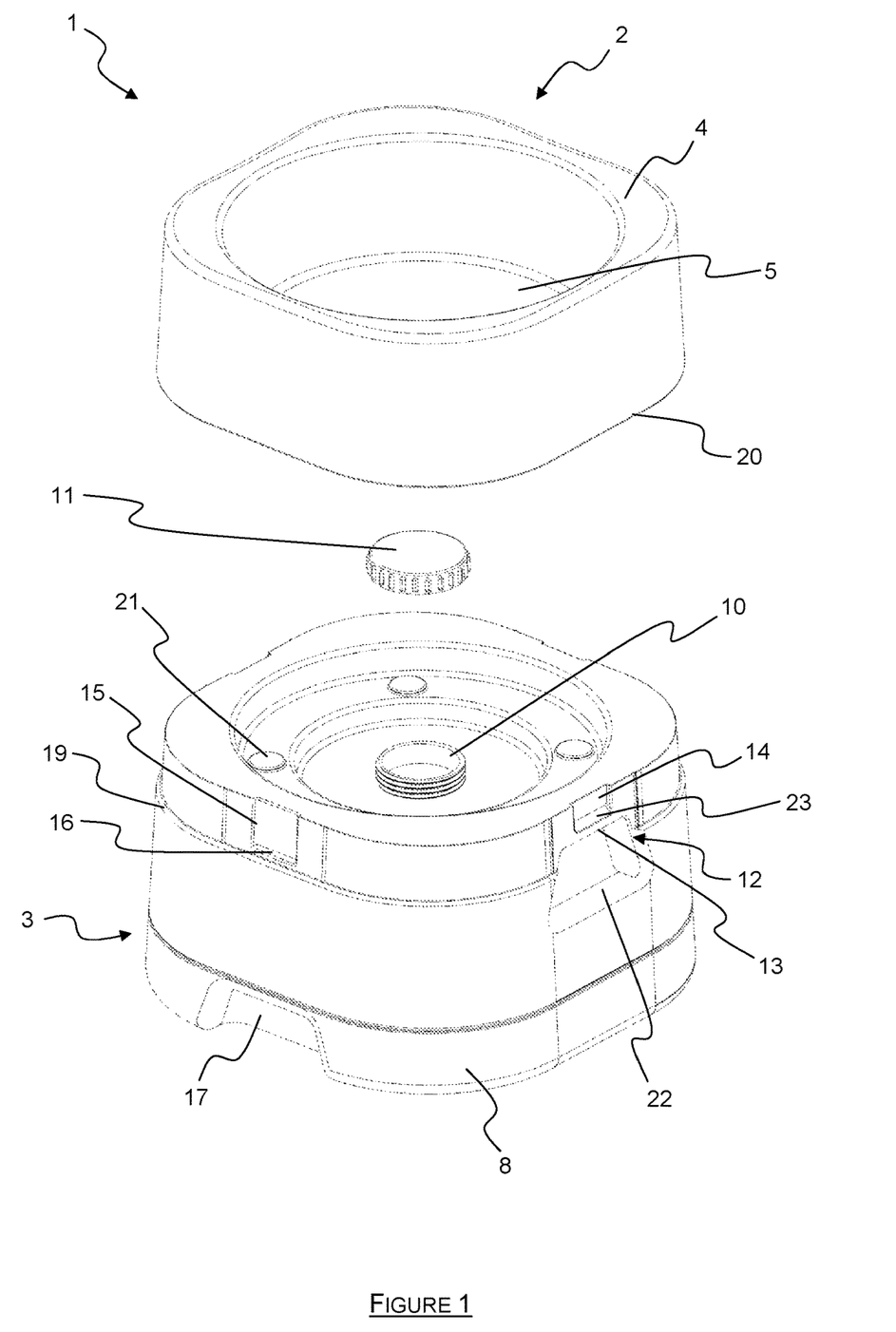
FIG. 1 is an exploded perspective view of a feeding bowl assembly according to a first embodiment of the present invention.
Figure 2:
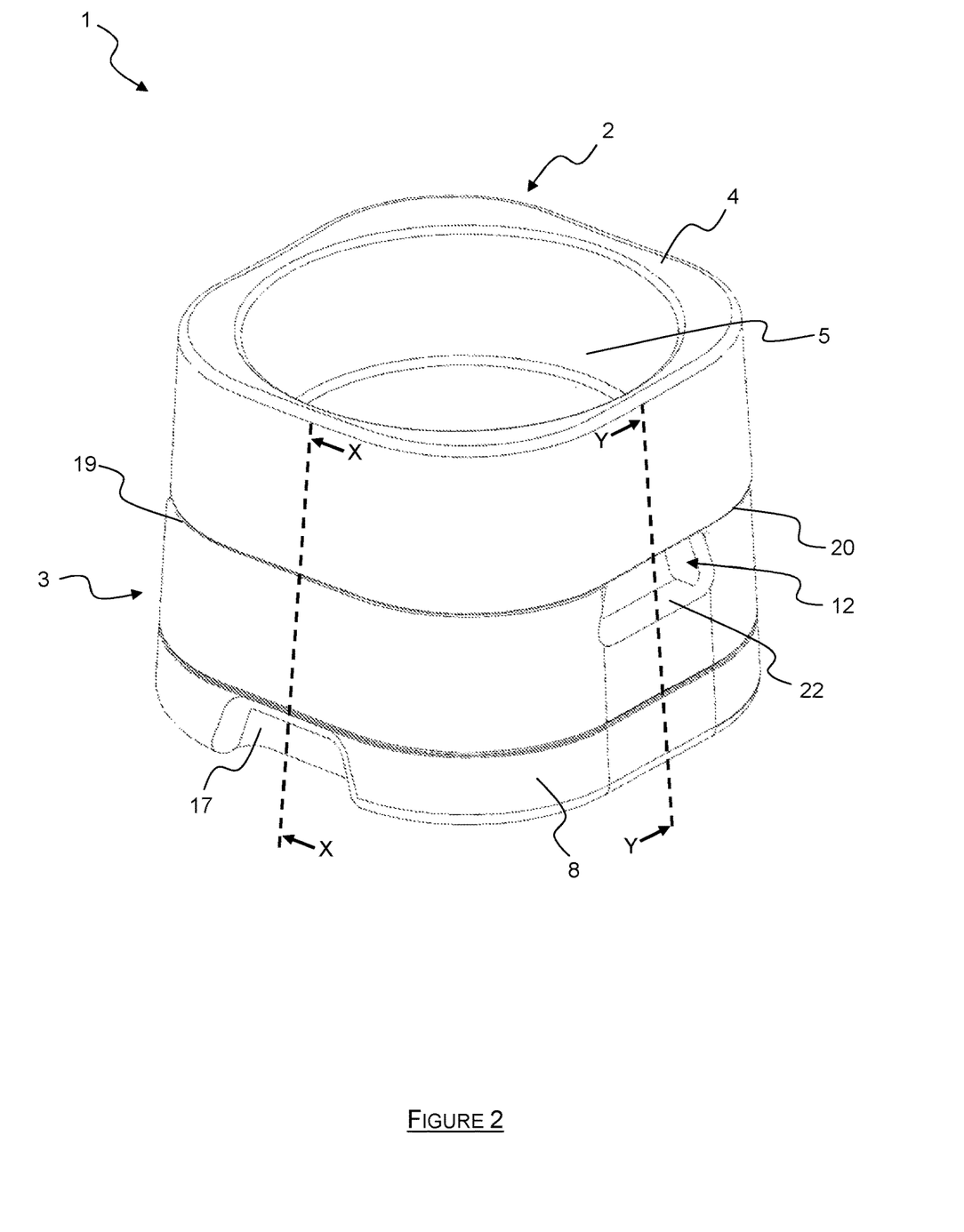
FIG. 2 is a perspective view of the feeding bowl assembly shown in FIG. 1, in which the feeding bowl has been mounted to the base.

In use, the feeding bowl 2, base 3 and closure 11 are initially separate. The base 3 is placed in a suitable position on a floor. Ballast such as sand and/or water is poured through the opening 10 to fill the reservoir 9 to the desired level. The closure 11 is then secured to the opening 10 to seal the reservoir 9 by fully engaging the screw thread on the closure 11 with the cooperating screw thread provided on the opening 10.

Animal feed or water is then poured into the cavity 5 of the feeding bowl 2.

Figure 3:
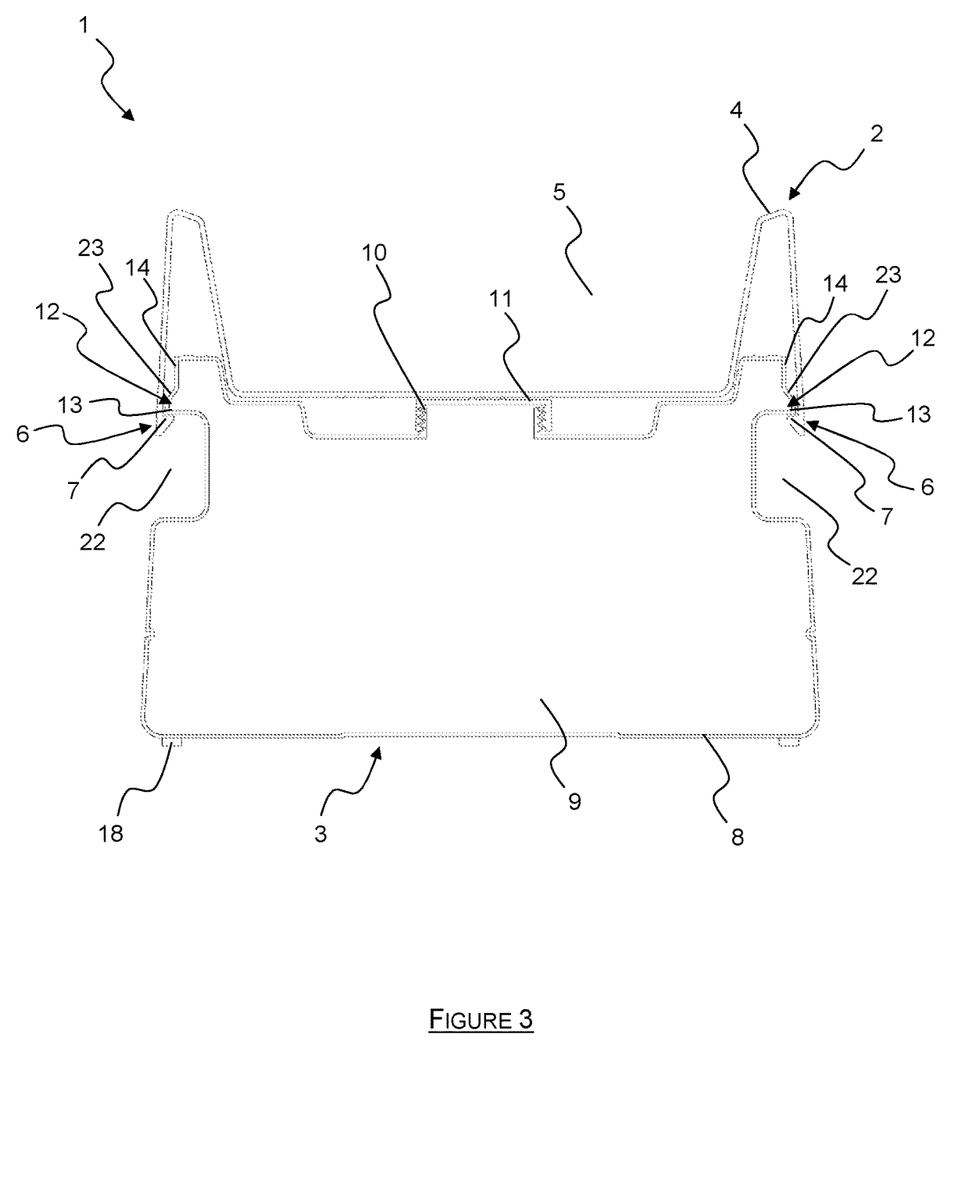
FIG. 3 is a side cross-sectional view of the feeding bowl assembly shown in FIG. 2; the cross-section being at line Y in FIG. 2.
Figure 4:
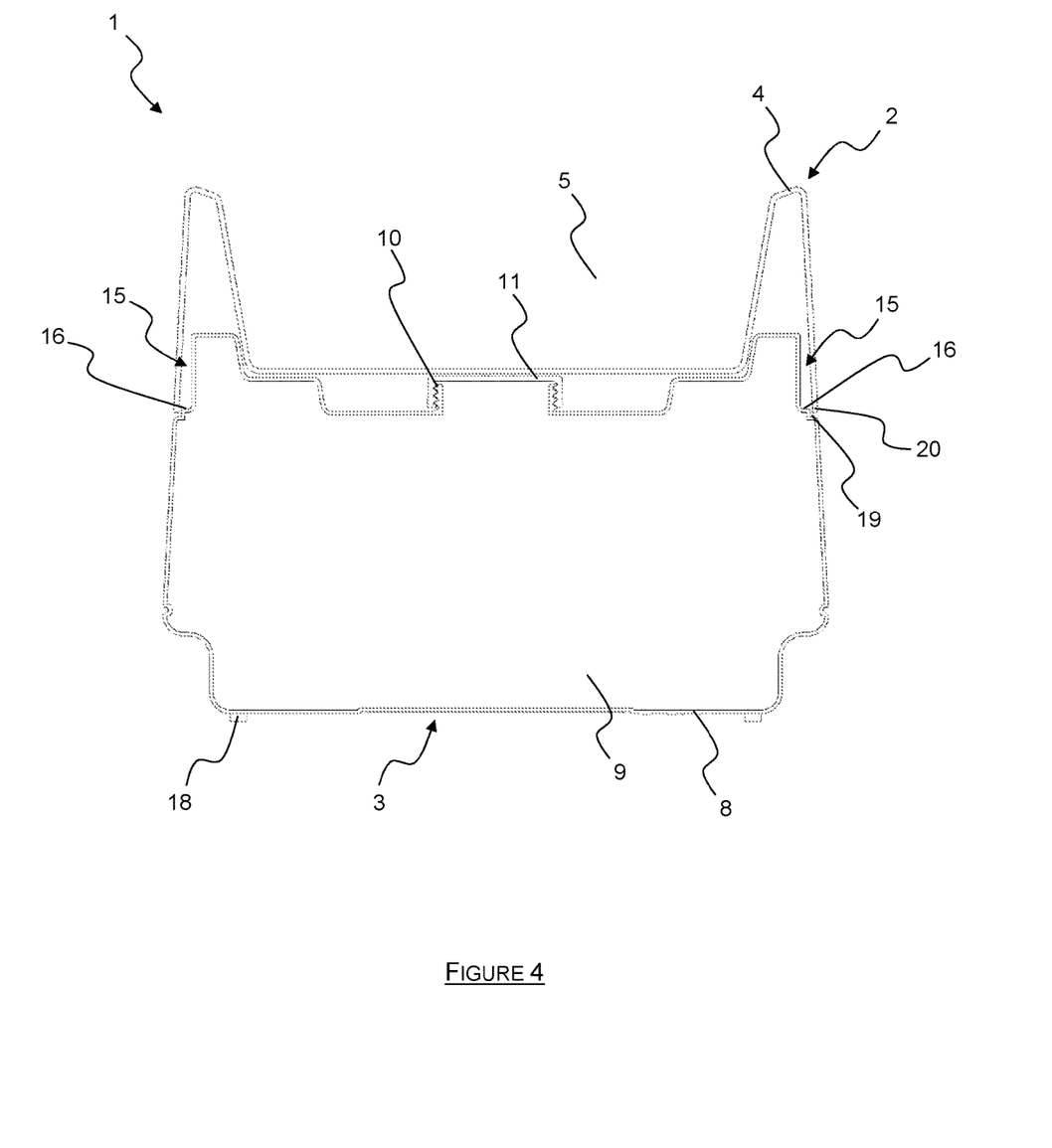
FIG. 4 is a side cross-sectional view of the feeding bowl assembly shown in FIG. 2; the cross-section being at line X in FIG. 2.

To mount the feeding bowl 2 to the base 3 in a locked orientation in which the feeding bowl 2 is locked securely to the base 3, the feeding bowl 2 is initially aligned concentrically with the base 3 and rotated to align the connectors 6 on the feeding bowl 2 with the complementary connectors 12 on the base 3. The feeding bowl 2 is then lowered on to the base 3. As the feeding bowl 2 is lowered, the engagement portion 7 of each connector 6 contacts with an opening portion 14. As each engagement portion 7 impinges on a ramp portion 23 of its contacted opening portion 14, the shape of the ramp portions 23 push the walls of the feeding bowl 2 on which the each connector 6 is formed to flex outwardly and displace the connectors 6 from the base 3. As the feeding bowl 2 is pressed further on to the base 3, the connectors 6 ride over the ramp portion 23 and the outside wall of the base 3 and are received into the notches 22 of the complementary connectors 12, allowing the walls of the feeding bowl 2 to snap back to their original non-flexed position. This action automatically engages the engagement portion 7 of each connector 6 with the engagement portion 13 of each complementary connector 12, which locks the feeding bowl 2 to the base 3. The bottom of the cavity 5 of the feeding bowl 2 abuts with each of the four upstands 21 of the base 3 to prevent the feeding bowl 2 from being pushed beyond this locked orientation. In this position, there is a small gap between the lower edge 20 of the feeding bowl 2 and the rim 19 of the base 3, around the circumference of the feeding bowl assembly 1.

To unlock and dismount the feeding bowl 2 from the base 3, a user inserts their fingers into each notch 22 and pulls the connectors 6 away from the complementary connectors 12, which flexes the walls of the feeding bowl 2 and disengages the engagement portion 7 of each connector 6 from the engagement portion 13 of the corresponding complementary connector 12. The feeding bowl 2 is then lifted upwards away from the floor and thus released from the separated base 3. The feeding bowl 2 can now be easily cleaned or refilled with food or water.

Figure 5:
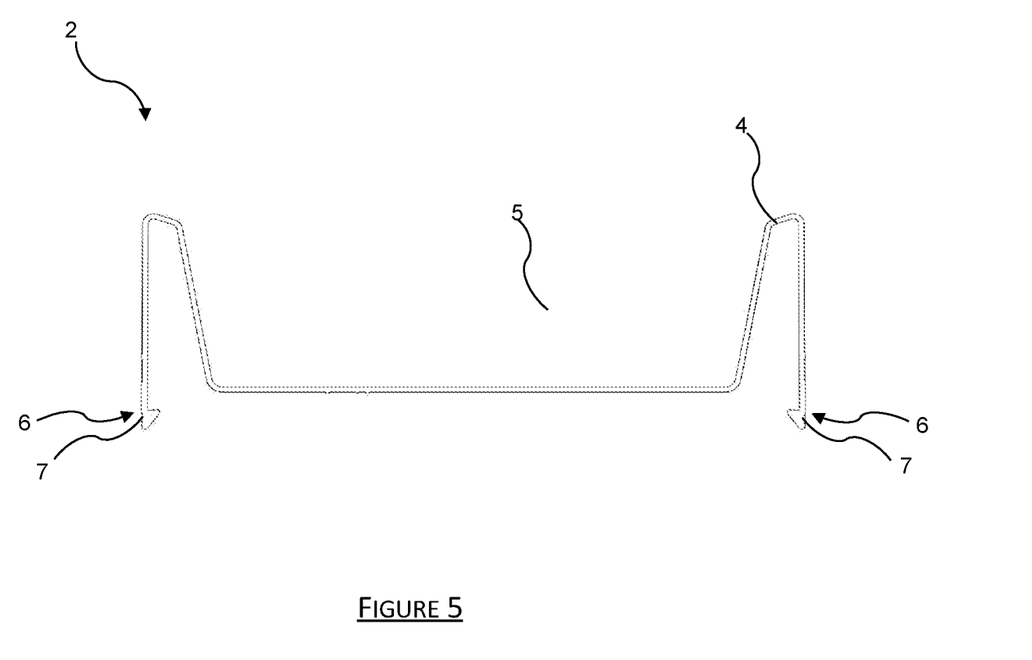
FIG. 5 is a side cross-sectional view of the feeding bowl.
Figure 6:
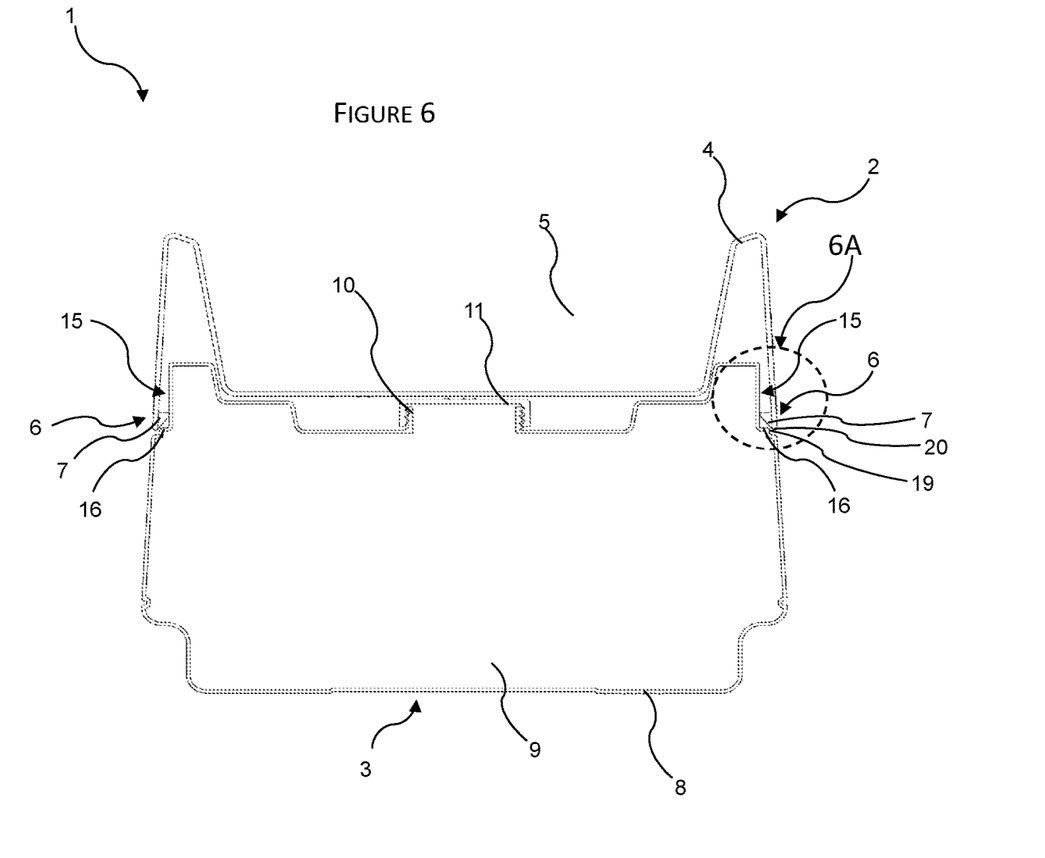
FIG. 6 is a side cross-sectional view of the feeding bowl assembly in the secured, but unlocked orientation.
Figure 6A:
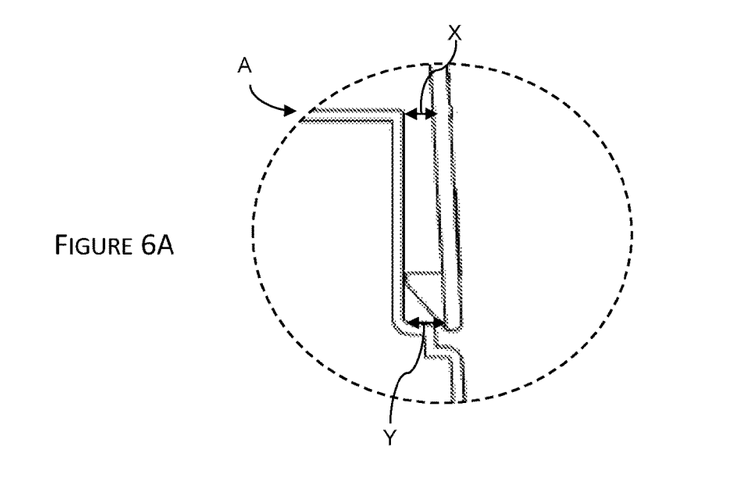
FIG. 6A is a magnified view of the circular portion labeled 6A in FIG. 6.

To mount the feeding bowl 2 to the base 3 in an unlocked orientation in which the feeding bowl 2 is secured to, but not locked to, the base 3, the feeding bowl 2 is initially (FIG. 5) aligned concentrically with the base 3 and rotated to align the connectors 6 on the feeding bowl 2 with the abutment portions 15 on the base 3 (which is 90° from the position when connectors 6 are aligned with the complementary connectors 12). The feeding bowl 2 is then lowered on to the base 3. As the feeding bowl 2 is lowered, the engagement portion 7 of each connector 6 on the feeding bowl 2 contacts with a top edge of an abutment portion 15, which causes the connected walls of the feeding bowl 2 to flex slightly outwardly and displace the connectors 6 from the base 3. As the feeding bowl 2 is pressed further on to the base 3 (FIG. 6), the engagement portion 7 of each connector 6 slides along the planer surface 16 of its contacted abutment portion 15 and is gradually received on to the planar surface 16 due to the varying depth of the abutment portion 15 (FIG. 6A). The connector 6 is now received into the indent of the abutment portion 15, and thus the feeding bowl 2 is mounted to the base 3 in the unlocked orientation. The bottom of the cavity 5 of the feeding bowl 2 abuts with each of the four up stands 21 of the base 3 to prevent the feeding bowl 2 from being pushed beyond this unlocked orientation. In this position, there is a small gap between the lower edge 20 of the feeding bowl 2 and the rim 19 of the base 3, around the circumference of the feeding bowl assembly 1.

To dismount the feeding bowl 2 from the base 3, the feeding bowl 2 is simply lifted off of the base 3. The engagement portions 7 of the connectors 6 slide upwards along the planar surfaces 16 and the engagement portions 7 of the connectors 6 are pushed away from the base 3 so that the feeding bowl 2 can be dismounted and released from the base 3. The feeding bowl 2 can now be easily cleaned or refilled with food or water.

Accordingly, the present invention provides a feeding bowl assembly 1 in which the feeding bowl 2 can be mounted to the weighted base 3 to prevent the feeding animal from moving the feeding bowl 2 around on the floor. In addition, the feeding bowl 2 can be mounted to the base 3 in either a locked orientation or an unlocked orientation. This improves the functionality and usefulness of the feeding bowl assembly 1 since, for example, the locked orientation can be used with boisterous and active animals, whereas the unlocked orientation can be used with slow, lethargic or inactive animals, or by an elderly or weak user, whilst still securing the feeding bowl 2 to the base 3 to prevent it from being moved around by the animal.

The above embodiment is described by way of example only. Many variations are possible without departing from the scope of the invention as defined in the appended claims.

For example, each connectors and complementary connector may comprise other cooperating arrangements such as each comprising one or more magnets.

What is claimed is:

1. An animal feeding bowl assembly comprising:
a feeding bowl comprising one or more connectors; and
a base comprising one or more complementary connectors, and one or more abutment portions each including an indent,
wherein the feeding bowl is releasably mountable to the base in a locked orientation and an unlocked orientation relative to the base, and the one or more connectors and one or more complementary connectors are arranged such that:
in the locked orientation:
the one or more connectors and the one or more complementary connectors are aligned, and the one or more abutment portions are not aligned with the one or more connectors, wherein the feeding bowl is retained on the base by at least one of the one or more connectors engaging with at least one of the one or more complementary connectors as the feeding bowl slides onto the base so that the feeding bowl is locked to the base, and,
in the unlocked orientation:
the feeding bowl is rotated relative to the locked orientation so that the one or more connectors and the one or more complementary connectors are not aligned, and the one or more abutment portions are aligned with the one or more connectors, wherein the one or more connectors are received by sliding into respective indents of the one or more abutment portions to be seated therein as the feeding bowl slides onto the base so that the feeding bowl is secured to, but not locked to, the base.

2. The animal feeding bowl assembly according to claim 1, wherein the feeding bowl is formed from a resilient material.

3. The animal feeding bowl assembly according to claim 1, wherein the feeding bowl comprises an even number of connectors.

4. The animal feeding bowl assembly according to claim 1, wherein each connector comprises an engagement portion for engaging with a complementary connector on the base.

5. The animal feeding bowl assembly according to claim 4, wherein each engagement portion is planar.

6. The animal feeding bowl assembly according to claim 1, wherein the base comprises a reservoir and an opening for allowing the reservoir to be filled with a substance and wherein the substance is a weight or ballast and the assembly further comprises a closure for opening and closing the reservoir, operated separately from the feeding bowl.

7. The animal feeding bowl assembly according to claim 1, wherein the base comprises an outer rim formed around its circumference and the outer rim provides a step formation for abutting with the feeding bowl.

8. The animal feeding bowl assembly according to claim 1, wherein the base comprises an even number of complementary connectors.

9. The animal feeding bowl assembly according to claim 1, wherein each complementary connector comprises one of a notch or an indent in a wall of the base that projects towards a center of the base.

10. The animal feeding bowl assembly according to claim 1, wherein each one of the one or more connectors comprises an engagement portion for engaging with a respective one of the one or more complementary connectors on the base and wherein each of the one or more complementary connectors comprises an engagement portion for engaging with the engagement portion of the respective one of the one or more connectors on the feeding bowl.

11. The animal feeding bowl assembly according to claim 10, wherein the base comprises a reservoir, and wherein each engagement formation of the one or more complementary connectors project towards a center of the reservoir.

12. The animal feeding bowl assembly according to claim 1, wherein the base includes one or more abutment portions, each of the one or more abutment portions has a varying depth over its surface area and the varying depth is greater at a bottom of the abutment portion than at a top of the abutment portion.

13. The animal feeding bowl assembly according to claim 1, wherein the base includes one or more abutment portions, each of which comprises a planar surface for contacting with a respective one of the one or more connectors and allowing the connector to slide thereon and wherein the one or more abutment portions are arranged to contact with a respective one of the one or more connectors when the feeding bowl is mounted in its unlocked orientation on the base.

14. The animal feeding bowl assembly according to claim 1, wherein the feeding bowl assembly comprises more than one engaging set of connectors and complementary connectors; each set is of a different size and wherein the sets of connectors and complementary connectors are arranged to engage with different locking strengths.

15. The animal feeding bowl assembly according to claim 1, wherein the feeding bowl assembly comprises more than one engaging set of connectors and complementary connectors; each set is of a different shape and wherein the sets of connectors and complementary connectors are arranged to engage with different locking strengths.

16. The animal feeding bowl assembly according to claim 1, wherein in the locked orientation the locking is effected by the one or more connectors flexing outwardly with respect to the base as the feeding bowl is slid onto the base.

17. The animal feeding bowl assembly according to claim 1, wherein in the unlocked orientation the bowl is secured to the base by the connectors flexing with respect to the base as the feeding bowl is slid onto the base to form an interference fit with the indents of the one or more abutment portions.

18. The animal feeding bowl assembly according to claim 1, wherein the base includes upstands to prevent the feeding bowl from being slid beyond the locked and unlocked orientations.

19. The animal feeding bowl assembly according to claim 1, wherein the base has an outside surface having a bottom, and the base includes a pair of handles formed on the bottom of the outside surface of the base.

20. The animal feeding bowl assembly according to claim 1, wherein the base includes ramp portions and each of the one or more connectors includes an engagement portion, and wherein, in the locked orientation, engagement portions of the one or more connectors contact the ramp portions as the feeding bowl slides onto the base, causing the one or more connectors to flex outwardly as the one or more connectors pass over the ramp portions before flexing inwardly to lock against the complementary connectors.

* * * * *